United States Patent
Lange et al.

(10) Patent No.: US 9,023,970 B2
(45) Date of Patent: May 5, 2015

(54) PROCESS FOR PREPARING POLYISOBUTENES

(71) Applicant: BASF SE, Ludwigshafen (DE)

(72) Inventors: Arno Lange, Bad Duerkheim (DE);
Matthias Kiefer, Ludwigshafen (DE);
Matthias Kleiner, Mannheim (DE);
Szilard Csihony, Gorxheimertal (DE);
Dietmar Posselt, Heidelberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/046,159

(22) Filed: Oct. 4, 2013

(65) Prior Publication Data

US 2014/0107310 A1     Apr. 17, 2014

Related U.S. Application Data

(60) Provisional application No. 61/712,842, filed on Oct. 12, 2012.

(51) Int. Cl.
| | | |
|---|---|---|
| C08G 77/04 | (2006.01) | |
| C08G 73/06 | (2006.01) | |
| C08G 65/34 | (2006.01) | |
| C08G 59/00 | (2006.01) | |
| C08G 75/32 | (2006.01) | |
| C08G 67/02 | (2006.01) | |
| C07C 31/18 | (2006.01) | |
| C08F 10/10 | (2006.01) | |

(52) U.S. Cl.
CPC ................................. C08F 10/10 (2013.01)

(58) Field of Classification Search
CPC ........................................................ C08F 10/10
USPC ............... 528/29, 425, 423, 403, 380, 392; 568/852
See application file for complete search history.

(56) References Cited

U.S. PATENT DOCUMENTS

| | | | |
|---|---|---|---|
| 4,327,201 A | 4/1982 | Kennedy et al. | |
| 4,910,321 A * | 3/1990 | Kennedy et al. | 549/213 |
| 4,946,889 A | 8/1990 | Nishioka | |
| 5,169,914 A | 12/1992 | Kaszas et al. | |
| 5,690,861 A | 11/1997 | Faust | |
| 5,981,785 A | 11/1999 | Faust et al. | |
| 2011/0306738 A1 | 12/2011 | Stokes et al. | |
| 2013/0267669 A1 | 10/2013 | Stokes et al. | |

FOREIGN PATENT DOCUMENTS

| | | |
|---|---|---|
| DE | 40 25 961 A1 | 2/1992 |
| DE | 43 19 672 A1 | 12/1994 |
| DE | 196 48 028 A1 | 3/1997 |
| DE | 196 10 350 A1 | 9/1997 |
| DE | 100 61 727 A1 | 6/2002 |
| DE | 102 32 157 A1 | 2/2004 |
| EP | 0 206 756 A2 | 12/1986 |
| EP | 0 264 214 A2 | 4/1988 |
| EP | 0 265 053 A2 | 4/1988 |
| EP | 0 722 957 A1 | 7/1996 |
| WO | WO 99/24480 A1 | 5/1999 |
| WO | WO 01/25293 A1 | 4/2001 |
| WO | WO 01/25294 A1 | 4/2001 |
| WO | WO 2004/113402 A1 | 12/2004 |

OTHER PUBLICATIONS

International Search Report issued Dec. 10, 2013 in Application No. PCT/EP2013/070825 (With English Translation of Category of Cited Documents).

Béla Iván, et al., "New Telechelic Polymers and Sequential Copolymers by Polyfunctional Initiator-Transfer Agents (Inifers). VII. Synthesis and Characterization of α, ω-Di(hydroxy)polyisobutylene", J. Polym. Sci.: Polym. Chem. Ed., vol. 18, 1980, pp. 3177-3191.

* cited by examiner

*Primary Examiner* — William Cheung
(74) *Attorney, Agent, or Firm* — Oblon, McClelland, Maier & Neustadt, L.L.P.

(57) ABSTRACT

Preparation of bifunctional polyisobutenes in which isobutene or an isobutene-containing monomer mixture is polymerized in the presence of a Lewis acid and a compound of the formula I

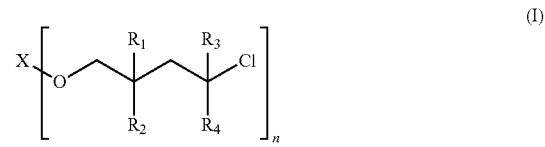

in which X is an acyl radical or the radical of an organic or inorganic acid group, $R_1$ to $R_4$ are identical or different and are hydrogen or a hydrocarbon radical.

7 Claims, No Drawings

PROCESS FOR PREPARING POLYISOBUTENES

This application claims benefit of U.S. Provisional Patent Application Ser. No. 61/712, 842, filed Oct. 12, 2012, which is hereby incorporated by reference.

The present invention relates to a process for preparing bifunctional polyisobutenes, and to bifunctional polyisobutenes obtainable by the process, and to certain functionalization products thereof.

Homo- and copolymers of isobutene are used in diverse ways, for example for producing fuel additives and lubricant additives, as elastomers, as adhesives or adhesive raw materials, or as a base constituent of sealants.

The preparation of polyisobutenes by living cationic polymerization of isobutene is known. The initiator system used generally comprises a Lewis acid and an organic compound which forms a carbocation or a cationogenic complex with the Lewis acid.

Polyisobutenes that are particularly suitable for further processing, for example to give sealants or to give adhesives or adhesive raw materials, are telechelic, i.e. they have two or more reactive end groups. These end groups are primarily carbon-carbon double bonds which can be further functionalized, or are groups functionalized with a terminating agent. For example, EP-A 722 957 describes the preparation of telechelic isobutene polymers using an at least difunctional inhibitor such as dicumyl chloride. A disadvantage of the known processes is that the aromatic initiators described can react to give indanyl or diindane groups, which adversely affects the targeted synthesis of defined telechelic polyisobutenes.

The German laid-open specification 100 61 727 describes the preparation of isobutene polymers with olefinically unsaturated end groups. To prepare isobutene polymers with two olefinically unsaturated end groups, bifunctional starters are used. The reactivity of the end groups obtained here leaves something to be desired. The German laid-open specification 102 32 157 describes a cationic isobutene polymerization using 3-chlorocyclopentene as initiator.

WO 2004/113402 describes the preparation of bifunctional polyisobutenes in which isobutene is polymerized in the presence of a Lewis acid and of an isobutene oligomer comprising an olefinic double bond as initiator.

It was an object of the present invention to provide a process with which bifunctional or in particular —OH functionalized polyisobutenes are obtainable with a simple initiator system.

Polyisobutenes which are terminated with an —OH function are valuable intermediates for preparing macromers (acrylates, epoxides, allyl ethers) or polymers (polyurethanes). This is thanks to Kennedy and Ivan, being the first to have published a synthesis route leading to such compounds via borane addition (Ivan, Kennedy, Chang; J. Polym. Chem. Chem. Ed. 18, 3177 (1980)). However, without wishing to cast doubt on the reproducibility of the data in this publication in an industrial chemistry laboratory it must be pointed out here that the use of boranes is too complex for producing technical-grade polymers.

In this respect, it was logical to make efforts to incorporate an —OH functionality directly into the polyisobutene chain by means of a suitable initiator and living cationic polymerization. A direct synthesis was only elucidated by Storey about 25 years later (Breland, Murphy, Storey; Polym. 47, 1852 (2006)). The initiator here is 3,3,5-trimethyl-5-chlorohexyl acetate, which is prepared by means of borane addition and Grignard synthesis.

However, this comprehensible pathway is also associated with the disadvantage of expensive feed materials and technically complex processes. In this respect, it has hitherto been the teaching that the use of boranes that are expensive and complex in terms of safety is required for the preparation of these aliphatically —OH functionalized polyisobutenes.

It was therefore surprising that, starting from technical-grade 2,2,4-trimethylpentanediol-(1,3), the initiators described below for the living polymerization, which achieve the object stated above, can be prepared using industrially customary processes and materials.

According to the invention, the object is achieved by a process for preparing bifunctional polyisobutenes in which isobutene or an isobutene-containing monomer mixture is polymerized in the presence of a Lewis acid or of a compound of the formula I

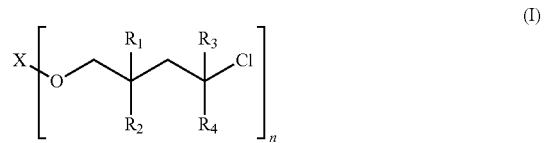

in which
n is the number 1, 2, 3 or 4,
X is an acyl radical of the formula $R_5CO$—or the radical of an organic or inorganic acid group which is covalently bonded to the oxygen atom of the compound (I) with its central atom Z, which is selected from S, P, N and B and carries at least one double-bonded oxygen atom, and whose possibly present hydroxyl functions are present in esterified form,
$R_1$ to $R_4$ are identical or different and are hydrogen, an aliphatic hydrocarbon radical (alkyl), cycloaliphatic hydrocarbon radical (cycloalkyl) or aromatic hydrocarbon radical (aryl) which has 1 to 20 carbon atoms, and
$R_5$ has the same meaning as $R_1$ to $R_4$ and additionally, in the case of n=2 to 4, can be further substituted with one or more further acyl groups at (n−1) position(s).

Accordingly, the invention relates to a process for preparing bifunctional polymers in which isobutene or an isobutene-containing monomer mixture is reacted in the presence of a Lewis acid with a compound of the formula I defined here. The compounds I are also referred to below as initiators or initiator compounds I.

Isobutene polymers which comprise an alcohol or an alcohol derivative (group X) on one terminus (so-called chain start) and a chlorine atom on the other terminus (so-called distal chain end) in particular are obtainable by the process according to the invention. Depending on the work-up conditions, it is also possible to obtain isobutene polymers which comprise an olefinic double bond instead of the chlorine atom. The double bond can then be converted, in a manner known per se, into another functionality, e.g. OH, SH, silane, siloxane, hydroxyphenyl, succinyl ester, succinimide, oxirane, carboxyl etc.

If one or more of the radicals $R_1$, $R_2$, $R_3$, $R_4$ and $R_5$ are alkyl, then it is a saturated, linear or branched hydrocarbon radical which typically has 1 to 20, often 1 to 10 and in particular 1 to 4, carbon atoms and which is for example methyl, ethyl, n-propyl, isopropyl, n-butyl, sec-butyl, isobutyl, tert-butyl, n-pentyl, 2-pentyl, 3-pentyl, 2-methylbutyl, 3-methylbutyl, 3-methylbut-2-yl, 2-methylbut-2-yl, 2,2-dimethylpropyl, n-hexyl, 2-hexyl, 3-hexyl, 2-methylpentyl, 2-methylpent-3-yl, 2-methylpent-2-yl, 2-methylpent-4-yl, 3-methylpent-2-yl, 3-methylpent-3-yl, 3-methylpentyl, 2,2- dimethylbutyl, 2,2-dimethylbut-3-yl, 2,3-dimethylbut-2-yl, 2,3-dimethylbutyl, n-heptyl, 2-methylhexyl, 2-methylhex-2-yl, 2-methylhex-3-yl, 2-methylhex-5-yl, 3-methylhex-2-yl, 3-methylhexyl, 3-methylhex-3-yl, 3-methylhex-4-yl, 2-methylhex-4-yl, 2,2-dimethylpentyl, 2,2-dimethylpent-3-yl, 2,2-dimethylpent-4-yl, 2,3-dimethylpent-2-yl, 2,3-dimethylpent-3-yl, 2,3-dimethylpent-4-yl, 2,3-dimethylpent-5-yl, 2,4-dimethylpentyl, 2,4-dimethylpent-2-yl, 2,4-dimethylpent-3-yl, 2,4-dimethylpent-4-yl, 2,4-dimethylpent-5-yl, 3,3-dimethylpentyl, 3,3-dimethylpent-2-yl, 3-ethylpentyl, 3-ethylpent-2-yl, 3-ethylpent-3-yl, 2,2,3-trimethylbutyl, 2,2,3-trimethylbut-3-yl, 2,2,3-trimethylbut-4-yl, n-octyl, 2-methylheptyl, 2-methylhept-2-yl, 2-methylhept-3-yl, 2-methylhept-4-yl, 2-methylhept-5-yl, 2-methylhept-6-yl, 2-methylhept-7-yl, 3-methylheptyl, 3-methylhept-2-yl, 3-methylhept-3-yl, 3-methylhept-4-yl, 3-methylhept-5-yl, 3-methylhept-6-yl, 3-methylhept-7-yl, 4-methylheptyl, 4-methylhept-2-yl, 4-methylhept-3-yl, 4-methylhept-4-yl, 2,2-dimethylhexyl, 2,2-dimethylhex-3-yl, 2,2-dimethylhex-4-yl, 2,2-dimethylhex-5-yl, 2,2-dimethylhex-6-yl, 2,3-dimethylhexyl, 2,3-dimethylhex-3-yl, 2,3-dimethylhex-4-yl, 2,3-dimethylhex-5-yl, 2,3-dimethylhex-6-yl, 2,4-dimethylhexyl, 2,4-dimethylhex-3-yl, 2,4-dimethylhex-4-yl, 2,4-dimethylhex-5-yl, 2,4-dimethylhex-6-yl, 2,5-dimethylhexyl, 2,5-dimethylhex-3-yl, 2,5-dimethylhex-4-yl, 2,5-dimethylhex-5-yl, 2,5-dimethylhex-6-yl, 3,3-dimethylhexyl, 3,3-dimethylhex-2-yl, 3,3-dimethylhex-4-yl, 3,3-dimethylhex-5-yl, 3,3-dimethylhex-6-yl, 3,4-dimethylhexyl, 3,4-dimethylhex-2-yl, 3,4-dimethylhex-4-yl, 3,4-dimethylhex-3-yl, 2-ethylhexyl, 3-ethylhexyl, 3-ethylhex-2-yl, 3-ethylhex-3-yl, 3-ethylhex-4-yl, 3-ethylhex-5-yl, 3-ethyl-hex-6-yl, 2,2,3-trimethylpentyl, 2,2,3-trimethylpent-3-yl, 2,2,3-trimethylpent-4-yl, 2,2,3-trimethylpent-5-yl, 2,2,4-trimethylpentyl, 2,2,4-trimethylpent-3-yl, 2,2,4-trimethylpent-4-yl, 2,2,4-trimethylpent-5-yl, 2,3,3-trimethylpentyl, 2,3,3-trimethylpent-2-yl, 2,3,3-trimethylpent-4-yl, 2,3,3-trimethylpent-5-yl, 2,3,4-trimethylpentyl, 2,3,4-trimethylpent-3-yl, 2,3,4-trimethylpent-2-yl, 3-ethyl-2-methylpentyl, 3-ethyl-2-methylpent-2-yl, 3-ethyl-2-methylpent-3-yl, 3-ethyl-2-methylpent-4-yl, 3-ethyl-2-methylpent-5-yl, 3-ethyl-3-methylpentyl, 3-ethyl-3-methylpent-2-yl, 2,2,3,3-tetramethylbutyl, n-nonyl, 2-methylnonyl, n-decyl, 2-propylheptyl, 3-propylheptyl and the like. Methyl is a preferred embodiment.

If one or more of the radicals $R_1$, $R_2$, $R_3$, $R_4$ and $R_5$ are cycloalkyl, it is then a saturated, optionally branched cyclic hydrocarbon radical which typically has 3 to 20, often 3 to 10 and in particular 5 or 6, carbon atoms, and which is for example cyclopropyl, cyclobutyl, cyclopentyl, cyclopentyl, cyclohexyl, cycloheptyl, cyclooctyl, bicyclo[2.2.1]hept-1-yl, bicyclo[2.2.1]hept-2-yl, bicyclo[2.2.1]hept-7-yl, bicyclo[2.2.2]octan-1-yl, bicyclo[2.2.2]octan-2-yl, 1-adamantyl or 2-adamantyl. Cyclohexyl is a preferred embodiment.

If one or more of the radicals $R_1$, $R_2$, $R_3$, $R_4$ and $R_5$ are aryl, it is then an aromatic, optionally substituted hydrocarbon radical; aryl is an aromatic hydrocarbon radical such as, for example, phenyl, 1-naphthyl or 2-naphthyl. Phenyl is a preferred embodiment.

In a further embodiment, the radicals are combined from the individual features, thus combinations such as benzyl, 4-methylcyclohexyl or ethylphenyl can be composed from alkyl, cycloalkyl and aryl radicals. The radicals $R_1$ to $R_5$ can, to a low extent, also carry heteroatoms such as halogen atoms, for example chlorine or fluorine, or inert functional groups such as cyano groups or ester groups, without losing their largely hydrocarbon character.

In one embodiment, n is 1 and the acyl radical X is an $R_5$—CO group, where $R_5$ is a hydrocarbon radical which is defined like the radicals $R_1$, $R_2$, $R_3$ and $R_4$. In this connection, it is also possible that the radicals are further substituted with halogen, for example Cl—$C_2H_4$—CO— or $CF_3$—CO—.

In another embodiment, n is 2, 3 or 4 and the acyl radical X is an $R_5$—CO group, where $R_5$ here is a radical which is defined like the radicals $R_1$, $R_2$, $R_3$ and $R_4$ and is further substituted at (n−1) position(s) with one or more acyl groups, for example a phthalyl, terphthalyl, gallyl, malonyl or succinyl radical then being present.

In a further embodiment, X is the radical of an organic or inorganic acid group with the central atom Z, for example in the case of n=1, $CH_3$—$SO_2$—, $CH_3$—O—$SO_2$— or $(CH_3$—$O)_2PO$— and in the case of n=2, 3 or 4, the groups —$SO_2$—, =PO— or =B—. If the central atom Z is selected from the elements S, P or N, it carries at least one double-bonded oxygen atom. In the case Z=B, three singly bonded oxygen atoms can also be linked to the central atom Z, for example in the case of boric acid ester groups such as $(CH_3$—$O)_2B$—.

Very particular preference is given to compounds of the formula I in which $R_1$, $R_2$, $R_3$ and $R_4$ are identical and are methyl.

The compounds of the formula (I) can be prepared in a manner known per se by ring opening of tetrahydrofurans of the formula II with acid derivatives of the formula III, as described in Reppe et al. Ann. Chem. 596, 110.

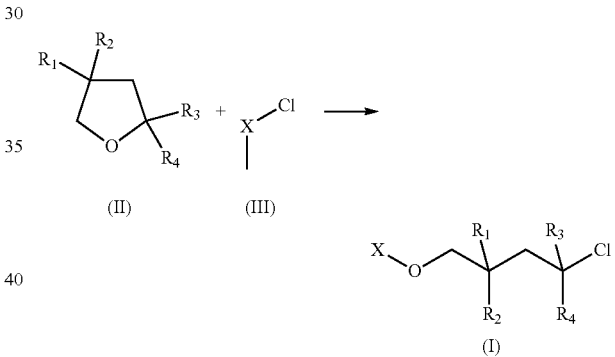

In this connection, X, $R_1$, $R_2$, $R_3$ and $R_4$ have the meanings already specified.

The tetrahydrofurans (II) can be prepared by rearrangement and cyclization from 1,3-diols of the formula IV.

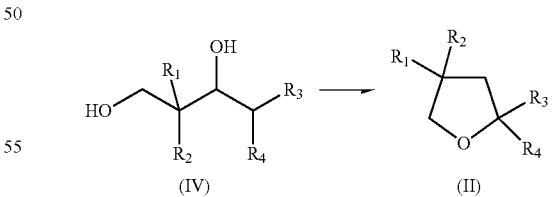

Here, $R_1$, $R_2$, $R_3$ and $R_4$ have the meanings already specified.

The conversion of (IV) to (II) and further the conversion with (III) to (I) can be carried out continuously or discontinuously. In particular, it is suitable to prepare the initiator (I) on an industrial scale in a continuous and/or discontinuous procedure. In a discontinuous procedure, this means batch sizes above 10 kg, better >100 kg, even more optimal >1000 kg or >5000 kg. In a continuous procedure, this means production amounts in excess of 100 kg/day, better >1000 kg/day, even more optimal >10 t/day or >100 t/day.

For the aforementioned synthesis of (II), compound (IV) can be used in dissolved, suspended, molten or gaseous form. Suitable solvents here are in principle all solvents which are inert under reaction conditions. Examples are hydrocarbons such as toluene, xylene, solvent naphtha, branched and linear aliphatics, alcohols or water.

The rate of the conversion of (IV) to (II) and further the conversion with (III) to (I) can be increased by acids. Typically, the acids are used in an amount of from 0.1 to 10% by weight, in particular 0.2 to 5% by weight, based on the compounds of the formula II. Preferred acids here are Brönstedt acids, for example organic carboxylic acids such as e.g. trifluoroacetic acid, oxalic acid or lactic acid, and also organic sulfonic acids such as methanesulfonic acid, trifluoromethanesulfonic acid or p-toluenesulfonic acid. Likewise of suitability are inorganic Brönstedt acids such as HCl, $H_3PO_4$, $H_2SO_4$ or $HClO_4$. $BF_3$, $BCl_3$, $SnCl_4$, $TiCl_4$, or $AlCl_3$, for example, can be used as Lewis acid. The use of complex-bonded Lewis acids or Lewis acids dissolved in ionic liquids is also possible. Defined acid strengths can be established as a result of combination with bases such as NaOH. Furthermore, it is possible to use solids with an acidic surface, for example silica, the surface of which can be further activated with one of the specified acids.

The conversion of (IV) to (II) can be carried out in a wide temperature range from ca. 60° C. to ca. 500° C. In this connection, for processes with a long residence time such as batch processes, primarily temperatures in the range from 100° C. to 300° C., preferably 150° C. to 250° C., will be selected, whereas for processes with a short residence time such as continuous processes, primarily temperatures in the range from 200° C. to 400° C. are appropriate. The reaction times here are in the range from a few seconds (for example 1, 2, 5, 10, 20, 100 or 200 seconds), a few minutes (for example 1, 2, 5, 10, 20, 30 or 40 minutes) ranging to hours (for example ca. 1, ca. 2, ca. 3 or ca. 5 hours).

Suitable Lewis acids for triggering the polymerization as per the process according to the invention, as defined in claim 1, are covalent metal halides and semi-metal halides which have an electron pair gap. Compounds of this type are known to the person skilled in the art, for example from J. P. Kennedy et al. in U.S. Pat. Nos. 4,946,889, 4,327,201, 5,169,914, EP-A 206 756, EP-A 265 053, and also in detail in the monograph by J. P. Kennedy and B. Ivan, Designed Polymers by Carbocationic Macromolecular Engineering, Oxford University Press, New York, 1991. The Lewis acids are generally selected from halogen compounds of titanium, of tin, of aluminum, of vanadium or of iron, and also the halides of boron. Preference is given to the chlorides, and, in the case of aluminum, also the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and boron trifluoride and in particular titanium tetrachloride.

It has proven successful to carry out the polymerization in accordance with the process according to the invention in the presence of an electron donor. Suitable electron donors are aprotic organic compounds which have a free electron pair located on a nitrogen, oxygen or sulfur atom. Preferred donor compounds are selected from pyridines such as pyridine itself, 2,6-dimethylpyridine, as well as sterically hindered pyridines such as 2,6-diisopropylpyridine and 2,6-di-tert-butylpyridine; amides, in particular N,N-dialkylamides of aliphatic or aromatic carboxylic acids such as N,N-dimethylacetamide; lactams, in particular N-alkyllactams such as N-methylpyrrolidone; ethers, e.g. dialkyl ethers such as diethyl ether and diisopropyl ether, cyclic ethers, such as tetrahydrofuran; amines, in particular trialkylamines such as triethylamine; esters, in particular $C_1$-$C_4$-alkyl esters of aliphatic $C_1$-$C_6$-carboxylic acids such as ethyl acetate; thioethers, in particular dialkyl thioethers or alkylaryl thioethers, such as methylphenyl sulfide; sulfoxides, in particular dialkyl sulfoxides, such as dimethyl sulfoxide; nitriles, in particular alkylnitriles such as acetonitrile and propionitrile; phosphines, in particular trialkylphosphines or triarylphosphines, such as trimethylphosphine, triethylphosphine, tri-n-butylphosphine and triphenylphosphine and non-polymerizable, aprotic organosilicon compounds which have at least one organic radical bonded via oxygen.

Among the aforementioned donors, pyridine and sterically hindered pyridine derivatives and also in particular organosilicon compounds are preferred.

Preferred organosilicon compounds of this type here are those of the general formula VI:

in which r is 1, 2 or 3, $R^a$ can be identical or different and, independently of one another, are $C_1$-$C_{20}$-alkyl, $C_3$-$C_7$-cycloalkyl, aryl or aryl-$C_1$-$C_4$-alkyl, where the three last-mentioned radicals can also have one or more $C_1$-$C_{10}$-alkyl groups as substituents, and $R^b$ can be identical or different and are $C_1$-$C_{20}$-alkyl and, for the case that r is 1 or 2, two radicals $R^b$ can together be alkylene.

In the formula VI, r is preferably 1 or 2. $R^a$ is preferably a $C_1$-$C_8$-alkyl group, and in particular a branched alkyl group or an alkyl group bonded via a secondary carbon atom, such as isopropyl, isobutyl, sec-butyl, or a 5-, 6- or 7-membered cycloalkyl group, or an aryl group, in particular phenyl. The variable $R^b$ is preferably a $C_1$-$C_4$-alkyl group or a phenyl, tolyl or benzyl radical.

Examples of preferred compounds of this type are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluoylsilane, triethoxybenzylsilane and triethoxyphenylsilane.

Within the context of the present invention, $C_1$-$C_4$-alkyl is a branched or linear alkyl radical, such as methyl, ethyl, propyl, isopropyl, n-butyl, sec-butyl, isobutyl or tert-butyl. Moreover, $C_1$-$C_8$-alkyl is in particular pentyl, hexyl, heptyl, octyl and positional isomers thereof. Moreover, $C_1$-$C_{20}$-alkyl is in particular nonyl, decyl, undecyl, dodecyl, tridecyl, tetradecyl, pentadecyl, hexadecyl, heptadecyl, octadecyl, nonadecyl, eicosyl and positional isomers thereof.

$C_3$-$C_7$-Cycloalkyl, for example, is cyclopropyl, cyclopentyl, cyclohexyl, cycloheptyl and cyclooctyl.

Aryl is in particular phenyl, naphthyl or tolyl.

Aryl-$C_1$-$C_4$-alkyl is in particular benzyl or 2-phenylethyl.

Alkylene is for example $C_2$-$C_5$-alkylene, such as 1,2-ethylene, 1,2- and 1,3-propylene, 1,4-butylene and 1,5-pentylene.

The Lewis acid is used in an amount which suffices to form the initiator complex from Lewis acid and initiator. The molar ratio of Lewis acid to initiator compound (I) is generally 10:1 to 1:10, in particular 1:1 to 1:4 and specifically 1:1 to 1:2.5.

The Lewis acid and the electron donor are preferably used in a molar ratio of from 20:1 to 1:20, particularly preferably from 5:1 to 1:5 and especially from 2:1 to 1:2.

The concentration of Lewis acid in the reaction mixture is usually in the range from 0.1 to 200 g/l and in particular in the range from 1 to 50 g/l.

Suitable isobutene feed materials for the process according to the invention are both isobutene itself and also isobutene-containing $C_4$-hydrocarbon streams, for example $C_4$-raffinates, $C_4$ cuts from the dehydrogenation of isobutene, $C_4$ cuts from steam crackers, FCC crackers (FCC: Fluid Catalyzed Cracking), provided they are largely freed from the 1,3-butadiene present therein. $C_4$-Hydrocarbon streams suitable according to the invention generally comprise less than 500 ppm, preferably less than 200 ppm, of butadiene. When using $C_4$ cuts as feed material, the hydrocarbons other than isobutene take on the role of an inert solvent.

It is also possible to react monomer mixtures of isobutene with olefinically unsaturated monomers which are copolymerizable with isobutene under cationic polymerization conditions. Moreover, the process according to the invention is suitable for the block copolymerization of isobutene with ethylenically unsaturated comonomers that can be polymerized under cationic polymerization conditions. If monomer mixtures of isobutene are to be copolymerized with suitable comonomers, the monomer mixture preferably comprises more than 80% by weight, in particular more than 90% by weight, and, particularly preferably, more than 95% by weight, of isobutene, and less than 20% by weight, preferably less than 10% by weight, and in particular less than 5% by weight, of comonomers.

Suitable copolymerizable monomers are vinyl aromatics such as styrene and α-methylstyrene, $C_1$-$C_4$-alkylstyrene such as 2-, 3- and 4-methylstyrene, and also 4-tert-butylstyrene, isoolefins having 5 to 10 carbon atoms such as 2-methylbutene-1,2-methylpentene-1,2-methylhexene-1,2-ethylpentene-1,2-ethylhexene-1 and 2-propylheptene-1. Suitable comonomers are also olefins which have a silyl group, such as 1-trimethoxysilylethene, 1-(trimethoxysilyl)propene, 1-(trimethoxysilyl)-2-methylpropene-2,1-[tri(methoxyethoxy)silyl]ethene, 1-[tri(methoxy-ethoxy)silyl]propene, and 1-[tri(methoxyethoxy)silyl]-2-methylpropene-2.

To prepare block copolymers, the distal chain end, i.e. the end of the resulting isobutene polymer facing away from the chain start which is derived from the initiator, can be reacted with comonomers, such as those listed above, e.g. vinyl aromatics. Thus, e.g. it is possible to firstly homopolymerize isobutene and then to add the comonomer. The comonomer-stem reactive chain end that is newly formed in the process is either deactivated or, in accordance with one of the embodiments described below, terminated to form a functional end group, or reacted afresh with isobutene to form higher block copolymers.

The polymerization is usually carried out in a solvent. Suitable solvents are all low molecular weight, organic compounds or mixtures thereof which have a suitable dielectric constant and no abstractable protons and which are liquid under the polymerization conditions. Preferred solvents are hydrocarbons, e.g. acyclic hydrocarbons having 2 to 8 and preferably 3 to 8, carbon atoms, such as ethane, iso- and n-propane, n-butane and its isomers, n-pentane and its isomers, n-hexane and its isomers, n-heptane and its isomers, and also n-octane and its isomers, cyclic alkanes having 5 to 8 carbon atoms such as cyclopentane, methylcyclopentane, cyclohexane, methylcyclohexane, cycloheptane, acyclic alkenes having preferably 2 to 8 carbon atoms such as ethene, iso- and n-propene, n-butene, n-pentene, n-hexene and n-heptene, cyclic olefins such as cyclopentene, cyclohexene and cycloheptene, aromatic hydrocarbons such as toluene, xylene, ethylbenzene, and also halogenated hydrocarbons, such as halogenated aliphatic hydrocarbons, e.g. such as chloromethane, dichloromethane, trichloromethane, chloroethane, 1,2-dichloroethane and 1,1,1-trichloroethane and 1-chlorobutane, and also halogenated aromatic hydrocarbons such as chlorobenzene and fluorobenzene. The halogenated hydrocarbons used as solvents comprise no compounds in which halogen atoms are positioned on secondary or tertiary carbon atoms.

Preferred solvents are aromatic hydrocarbons, of which toluene is particularly preferred. Preference is likewise given to solvent mixtures which comprise at least one halogenated hydrocarbon and at least one aliphatic or aromatic hydrocarbon. In particular, the solvent mixture comprises hexane and chloromethane and/or dichloromethane. The volume ratio of hydrocarbon to halogenated hydrocarbon here is preferably in the range from 1:10 to 10:1, particularly preferably in the range from 4:1 to 1:4 and especially in the range from 2:1 to 1:2.

Preference is also given to chlorinated hydrocarbons whose polarity allows polymerization in a uniform solvent. Examples are the propyl, butyl and pentyl chlorides and 1-chlorobutane and 2-chloropropane.

As a rule, the process according to the invention will be carried out at temperatures below 0° C., e.g. in the range from 0 to −140° C., preferably in the range from −30 to −120° C., and particularly preferably in the range from −40 to −110° C. The reaction pressure is of minor importance.

The heat of the reaction is dissipated in the usual way, for example by means of wall cooling and/or by exploiting evaporative cooling.

To terminate the reaction, the living distal chain ends are deactivated, for example by adding a protic compound, in particular by adding water, alcohols such as methanol, ethanol, n-propanol, isopropanol, n-butanol, isobutanol, sec-butanol or tert-butanol, or mixtures thereof with water.

The process according to the invention gives telechelic (bifunctional) polyisobutenes which firstly have an alcohol function on the chain start which is introduced by the radical X—O— of the initiator compound of the formula I, and secondly comprise a terminus (distal chain end, i.e. chain end opposite to the chain start) with a functional group. This functional group is preferably a group of the formula —$CH_2$—$C(CH_3)_2$-halogen. This is formed mostly upon reaction termination with a protic deactivating agent. The halogen atom in this terminal group generally originates from the Lewis acid used for the polymerization. Preferably, halogen is chlorine.

These telechelic polyisobutenes are valuable intermediates for preparing further bifunctional polyisobutene derivatives. Examples of the derivatization which may be mentioned are the alkylation of phenols and the elimination of hydrogen halide from the group —$CH_2$—$C(CH_3)_2$-halogen to form an ethylenically unsaturated terminal group.

Converting the terminal group —$CH_2$—$C(CH_3)_2$-halogen into an ethylenically unsaturated radical (methylidene double bond) can take place for example by thermal means, e.g. by heating to a temperature of 70 to 200° C., or by treatment with a base. Suitable bases are e.g. alkali metal alkoxides, such as sodium methoxide, sodium ethoxide and potassium tert-butoxide, basic aluminum oxide, alkali metal hydroxides such as sodium hydroxide, and tertiary amines such as pyridine or tributylamine, cf. Kennedy et al., Polymer Bulletin 1985, 13, 435-439. Preference is given to using sodium ethoxide.

However, it is also possible to obtain polyisobutenes ethylenically terminated at the chain end without introducing the group —CH$_2$—C(CH$_3$)$_2$-halogen beforehand. For this, the living chain end of the isobutene polymer is reacted in a suitable way with a terminating reagent, which adds an ethylenically unsaturated group to the chain end.

Suitable terminating reagents are, for example, trialkylallylsilane compounds, e.g. trimethylallylsilane. The living chain end is terminated here by adding a trialkylallylsilane compound. The use of the allylsilanes leads to the termination of the polymerization while introducing an allyl radical at the end of the polymer chain, cf. EP 264 214.

Another example of a terminating reagent is 1,1-diphenylethylene. The living chain end here is terminated by adding 1,1-diphenylethylene and a base, as a result of which a diphenyl-substituted double bond is introduced at the chain end, cf. J. Feldthusen, B. Ivan, A. H. E. Müller and J. Kops, Macromol. Rep. 1995, A32, 639, J. Feldthusen, B. Ivan and A. H. E. Müller, Macromolecules 1997, 30, 6989 and Macromolecules 1998, 31, 578, DE-A 19648028 and DE-A 19610350.

Conjugated dienes, e.g. butadiene, are also suitable as terminating reagents. In this connection, the reactive chain end is reacted with the conjugated diene and then deactivated as described previously, cf. DE-A 40 25 961.

Moreover, telechelic polyisobutenes which have an alcohol function on all of the chain ends which are derived from the radical XO— of the compound (I) are obtainable with the process according to the invention. For this purpose, two or more living polymer chains are coupled by adding a coupling agent. Coupling means the formation of chemical bonds between the reactive chain ends, meaning that two or more polymer chains of the living polyisobutene formed according to the invention are joined to form a molecule via their distal ends. The molecules obtained by coupling are symmetrical telechelic or star-shaped molecules with functions —OX at the molecule ends and/or the ends of the branches of the star-shaped molecule. In this way, it is also possible to prepare triblock copolymers of the type AB-BA by coupling living copolymers of the type AB$^+$, wherein A is a polyisobutene block and B is a polymer block different therefrom, e.g. a polyvinylaromatic block.

Suitable coupling agents have for example at least two electrofugal leaving groups arranged in the allyl position relative to the same or different double bonds, e.g. trialkylsilyl groups, meaning that the cationic center of a reactive chain end can position itself in a concerted reaction with the elimination of the leaving group and shift of the double bond. Other coupling agents have at least one conjugated system onto which the cationic center of a reactive chain end can be added electrophilically to form a stabilized cation. As a result of the elimination of a leaving group, e.g. of a proton, a stable s bond to the polymer chain then arises with the re-formation of the conjugated system. A plurality of these conjugated systems can be joined together by inert spacers.

Suitable coupling agents include:
(i) compounds which have at least two 5-membered heterocycles with a heteroatom selected from oxygen, sulfur and nitrogen, e.g. organic compounds which have at least two furan rings, such as

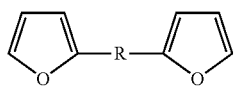

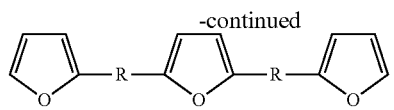

in which R is C$_1$-C$_{10}$-alkylene, preferably methylene or 2,2-propanediyl;
(ii) compounds with at least two allyl-position trialkylsilyl groups, such as 1,1-bis(trialkylsilylmethyl)ethylenes, e.g. 1,1-bis(trimethylsilylmethyl)ethylene, or such as bis[(trialkylsilyl)propenyl]benzenes, e.g.

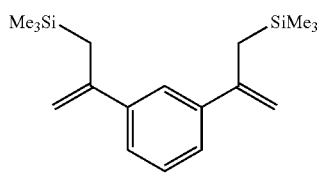

(in which Me is methyl), (iii) compounds with at least two vinylidene groups arranged conjugated to two aromatic rings in each case, such as bisdiphenylethylenes, e.g.

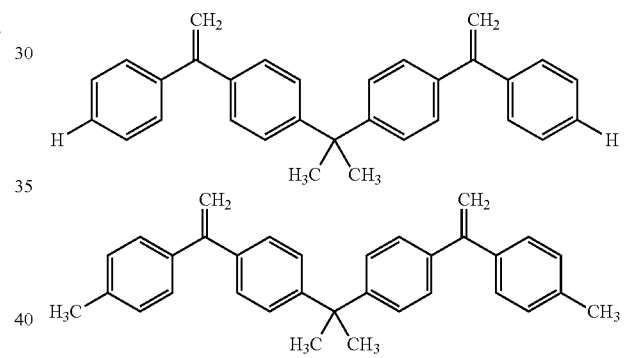

A description of suitable coupling agents can be found in the following literature sources; the coupling reaction can be carried out in an analogous manner to the reactions described therein: R. Faust, S. Hadjikyriacou, Macromolecules 2000, 33, 730-733; R. Faust, S. Hadjikyriacou, Macromolecules 1999, 32, 6393-6399; R. Faust, S. Hadjikyriacou, Polym. Bull. 1999, 43, 121-128; R. Faust, Y. Bae, Macromolecules 1997, 30, 198; R. Faust, Y. Bae, Macromolecules 1998, 31, 2480; R. Storey, Maggio, Polymer Preprints 1998, 39, 327-328; WO99/24480; U.S. Pat. Nos 5,690,861 and 5,981,785.

The coupling generally takes place in the presence of a Lewis acid, suitable Lewis acids being those which can also be used for carrying out the actual polymerization reaction. Moreover, the same solvents and temperatures are also suitable for carrying out the coupling reaction as are used for carrying out the actual polymerization reaction. Expediently, the coupling can therefore be carried out as a one-pot reaction after the polymerization reaction in the same solvent and in the presence of the Lewis acid used for the polymerization. Usually, a molar amount of the coupling agent is used which corresponds approximately to the quotient of the molar amount of the initiator of the formula I used for the polymerization, divided by the number of coupling sites of the coupling agent.

After the termination (deactivation and/or introduction of an ethylenically unsaturated terminal group) or coupling, the solvent is generally removed in suitable units such as rotary evaporators, falling film evaporators or thin layer evaporators, or by decompressing the reaction solution.

In one embodiment of the process according to the invention, the polymerization is carried out discontinuously, i.e. as batch reaction. For this, it is possible for example to introduce isobutene in a solvent, add initiator and optionally further additives such as siloxanes, and start the reaction with a Lewis acid. It is likewise possible to introduce solvent, initiator, Lewis acid and optionally further additives such as siloxanes, and to control the reaction by continuously adding isobutene. In all cases, the reaction temperature will be maintained in the desired range by means of suitable cooling measures. A particular challenge during the polymerization is the high heat of reaction that is produced within a short period. It was therefore a further object of the present invention to provide a process which makes it possible to control the rapid release of heat from the reaction. Polymerizations carried out on an industrial scale in particular present a challenge with regard to the rapid release of heat that is produced with relatively large conversion amounts. It was therefore a further object of the present invention to provide a process which makes it possible to carry out polymerization reactions on an industrial scale.

In another embodiment of the process according to the invention, the polymerization is carried out continuously. In order to achieve higher molecular weights in a living cationic polymerization, it is necessary to achieve a good temperature control via the dissipation of heat in continuous polymerization processes. Accordingly, reactors with high heat transfer surfaces relative to the reaction volume are appropriate. Besides tubular reactors, these may also be reactors with rectangular channels, stirred-tank reactors or certain micro- or milli-reactors. Micro- or milli-reactors permit good temperature control even in the case of highly exothermic reactions. The relatively large ratio of surface area to reactor volume permits, for example, very good heat supply and/or dissipation, for which reason even highly exothermic reactions can be carried out virtually isothermally. Moreover, milli-reactors in particular can be readily scaled up to the industrial scale on account of their design.

In a preferred embodiment of the process according to the invention, the polymerization is carried out in a continuous process which comprises at least the following steps:
(I) continuous metering in of isobutene, solvent, initiator and if desired further additives into a mixer and mixing the starting materials in the mixing unit;
(II) start of the continuous polymerization by continuous metering in of a Lewis acid and mixing with the starting materials at reaction temperature;
(III) continuous polymerization, by conveying the resulting reaction mixture through at least one reaction zone thermostated to reaction conditions.

The following apparatuses can preferably be used:

The polymerization is preferably carried out using milli-reactors—especially if it is carried out continuously. Milli-reactors differ from conventional apparatuses by virtue of their characteristic dimensions. Within the context of the present invention, the characteristic dimension of a flow device, e.g. of a mixer or of a reactor, is understood as meaning the smallest expansion at right angles to the direction of flow. The characteristic dimension of milli-reactors is significantly smaller than that of conventional apparatuses. It can be in particular in the millimeter range. Compared to conventional reactors, milli-reactors therefore exhibit significantly different behavior with regard to the heat and mass transfer processes that are taking place. By virtue of the greater ratio of surface area to reactor volume, for example, very good heat supply and/or dissipation are permitted, for which reason even highly endothermic or exothermic reactions can be carried out approximately isothermally. Compared to microreactors, the characteristic dimensions of which are in the micrometer range, milli-reactors are less susceptible to blockage on account of the characteristic dimensions and therefore have a higher robustness with regard to industrial application.

Conventional reactors have a characteristic dimension of >30 mm, whereas milli-reactors have a characteristic dimension of 30 mm or less. The characteristic dimension of a milli-reactor for the polymerization of isobutene or of an isobutene-containing monomer mixture is generally at most 30 mm, in particular 0.1 to 30 mm or preferably 0.3 to 30 mm or particularly preferably 0.5 to 30 mm; preferably at most 20 mm, e.g. 0.1 to 20 mm or preferably 0.3 to 20 mm or particularly preferably 0.5 to 20 mm; particularly preferably at most 15 mm, e.g. 0.1 to 15 mm or preferably 0.3 to 15 mm or particularly preferably 0.5 to 15 mm; more preferably at most 10 mm, e.g. 0.1 to 10 mm or preferably 0.3 to 10 mm or particularly preferably 0.5 to 10 mm; even more preferably at most 8 mm, e.g. 0.1 to 8 mm or preferably 0.3 to 8 mm or particularly preferably 0.5 to 8 mm; in particular at most 6 mm, e.g. 0.1 to 6 mm or preferably 0.3 to 6 mm or particularly preferably 0.5 to 6 mm; and specifically at most 4 mm, e.g. 0.1 to 4 mm or preferably 0.3 to 4 mm or particularly preferably 0.5 to 4 mm.

Milli-reactors to be used according to the invention are preferably selected from temperature-controllable tubular reactors, tube bundle heat exchangers, plate heat exchangers and temperature-controllable tubular reactors with internals. Tubular reactors, tube bundle heat exchangers and plate heat exchangers to be used according to the invention have, as characteristic dimensions, tube or capillary diameters in the range from preferably 0.1 mm to 25 mm, particularly preferably in the range from 0.5 mm to 6 mm, more preferably in the range from 0.7 to 5 mm and in particular in the range from 0.8 mm to 4 mm, and layer heights and/or channel widths in the range from preferably 0.2 mm to 10 mm, particularly preferably in the range from 0.2 mm to 6 mm and in particular in the range from 0.2 mm to 4 mm. Tubular reactors with internals to be used according to the invention have tube diameters in the range from 5 mm to 500 mm, preferably in the range from 8 mm to 200 mm and particularly preferably in the range from 10 mm to 100 mm. Alternatively, it is also possible in accordance with the invention to use flat channels comparable to plate apparatuses with inlaid mixing structures. They have heights in the range from 1 mm to 20 mm and widths in the range from 10 mm to 1000 mm and in particular in the range from 10 mm to 500 mm. Optionally, the tubular reactors can comprise mixing elements permeated by temperature control channels.

The optimal characteristic dimension arises here from the requirements on the permissible anisothermicity of the reaction, the maximum permissible pressure drop and the susceptibility of the reactor to becoming blocked.

Particularly preferred milli-reactors are:
tubular reactors composed of capillaries, capillary bundles with tube cross sections of 0.1 to 25 mm, preferably from 0.5 to 6 mm, particularly preferably from 0.7 to 4 mm, with or without additional mixing internals, where a temperature control medium may flow around the tubes or capillaries;

tubular reactors in which the heat carrier is conducted into the capillaries/tubes, and the product whose temperature is to be controlled is conducted around the tubes and homogenized by internals (mixing elements);

plate reactors which, like plate heat exchangers, are constructed with insulated parallel channels, networks of channels or areas which are equipped with or without flow-breaking internals (posts), where the plates conduct product and heat carrier in parallel or in a layer structure which has alternating heat carrier and product layers, such that chemical and thermal homogenicity can be ensured during the reaction;

reactors with "flat" channel structures which have a "milli dimension" only with respect to the height and can be virtually as broad as desired, the typical comb-like internals of which prevent the formation of a flow profile and lead to a narrow residence time distribution which is important for the defined reaction and residence time.

In a preferred embodiment of the invention, at least one reactor is used which largely has the residence time characteristics of plug flow. If plug flow is present in a tubular reactor, the state of the reaction mixture (e.g. temperature, composition etc.) can vary in flow direction, but the state of the reaction mixture is the same for each individual cross section perpendicular to the flow direction. Consequently, all of the volume elements entering the tube have the same residence time in the reactor. Figuratively, the liquid flows through the tube as if it were an array of plugs sliding easily through the tube. In addition, the crossmixing as a result of the intensified mass transfer perpendicular to the flow direction can compensate for the concentration gradient perpendicular to the flow direction.

Despite the mostly laminar flow through apparatuses with microstructures, back-mixing can thus be avoided and a narrow residence time distribution can be achieved in a similar manner to that in an ideal flow tube.

The Bodenstein number Bo is a dimensionless parameter and describes the ratio of the convection flow to the dispersion flow (e.g. M. Baerns, H. Hofmann, A. Renken, Chemische Reaktionstechnik [Chemical Reaction Technology], Lehrbuch der Technischen Chemie [Textbook of Industrial Chemistry], volume 1, $2^{nd}$ edition, p. 332 ff), it thus characterizes the back-mixing within a system:

$$Bo = \frac{uL}{D_{ax}}$$

where u is the flow rate [ms$^{-1}$], L is the length of the reactor [m] and $D_{ax}$ is the axial dispersion coefficient [m$^2$h$^{-1}$].

A Bodenstein number of zero corresponds to complete back-mixing in an ideal continuous stirred tank. An infinitely large Bodenstein number, in contrast, means absolutely no back-mixing, as in the case of continuous flow through an ideal flow tube.

In capillary reactors, the desired back-mixing behavior can be established by adjusting the ratio of length to diameter as a function of the substance parameters and the flow state. The underlying calculation methods are known to the person skilled in the art (e.g. M. Baerns, H. Hofmann, A. Renken: Chemische Reaktionstechnik, Lehrbuch der Technischen Chemie, volume 1, $2^{nd}$ edition, p. 339 ff). If very low-back-mixing behavior is to be realized, the above-defined Bodenstein number is selected to be preferably greater than 10, particularly preferably greater than 20 and especially greater than 50. For a Bodenstein number of greater than 100, the capillary reactor then has substantially plug flow character.

Materials which have proven to be advantageous for the mixers and reactors to be used according to the invention are stainless steels which are austenitic in the region of low temperatures, such as 1.4541 or 1.4571, generally known as V4A and as V2A respectively, and stainless steels of US grades SS316 and SS317Ti. At higher temperatures and under corrosive conditions, polyether ketones are likewise suitable. However, it is also possible to use more corrosion-resistant Hastelloy® grades, glass or ceramic as materials and/or corresponding coatings, such as, for example, TiN3, Ni-PTFE, Ni-PFA or the like, for the reactors to be used according to the invention.

The reactors are constructed such that the heat transfer surfaces are in very good contact with a temperature control medium so that very good heat transfer between the reaction mixture in the reaction zone and the temperature control medium is possible and an essentially isothermal reaction is possible.

The temperature control medium should have a sufficiently high heat capacity, be circulated intensively and be provided with a thermostat unit of sufficient power. The heat transfer between the reaction zone and the temperature control medium should be as good as possible in order to ensure the most homogeneous temperature distribution possible in the reaction zone.

For this purpose—according to the exothermicity and characteristic reaction time of the polymerization reaction—the ratio of heat exchange area to reaction volume should generally be selected to be between ca. 50 and ca. 5000 m$^2$/m$^3$, preferably between ca. 100 and ca. 3000 m$^2$/m$^3$, particularly preferably between ca. 150 and ca. 2000 m$^2$/m$^3$ and in particular between ca. 200 and ca. 1300 m$^2$/m$^3$. Typically, the values for reactors with production capacities of ca. 5000 tons per year are in the region of ca. 200 m$^2$/m$^3$, for reactors with production capacities of ca. 500 tons per year in the region of ca. 500 m$^2$/m$^3$ and for reactors on a laboratory scale ca. 600 to 1300 m$^2$/m$^3$.

Furthermore, the heat transfer coefficient on the side of the reaction medium should as a rule be more than 50 W/m$^2$K, preferably more than 100 W/m$^2$K, particularly preferably more than 200 W/m$^2$K and in particular more than 400 W/m$^2$K.

The bifunctional polyisobutenes prepared by the process according to the invention have a narrow molecular weight distribution. The polydispersity index PDI=$M_w/M_n$ is here in most cases less than 2.0, preferably below 1.60, particularly preferably below 1.40 and in particular below 1.35.

Preferably, the process according to the invention is used for preparing bifunctional polyisobutenes with a number-average molecular weight $M_n$ of from 200 to 100 000, particularly preferably from 400 to 50 000 and in particular from 500 to 15 000.

The bifunctional polyisobutenes prepared according to the invention are terminated at one chain end (chain start) by alcohol function XO— of the initiator of the formula I. The opposite (distal) end group is preferably a group —CH$_2$—C(CH$_3$)$_2$-halogen, particularly preferably —CH$_2$—C(CH$_3$)$_2$—Cl.

Alternatively, the opposite group is preferably an ethylenically unsaturated group which, as described above, is obtainable thermally or by reacting the halogen-substituted chain end with a suitable base or by reacting the living polyisobutene chains formed during the polymerization with a trialkylallylsilane compound, with 1,1-diphenylethylene or a conjugated diene. Moreover, polyisobutenes which are terminated at all chain ends by functions —OX are also obtainable with the process according to the invention by coupling the living polyisobutene chains.

The present invention further provides a polyisobutene which is terminated at at least one end of the molecule by a group of the formula V,

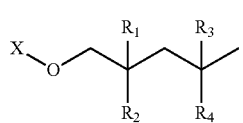

in which X, $R_1$, $R_2$, $R_3$ and $R_4$ are as defined above, or a functionalization product thereof, which is obtainable by
i) hydrosilylation,
ii) hydrosulfuration,
iii) electrophilic substitution on aromatics,
iv) epoxidation and optionally reaction with nucleophiles,
v) hydroboration and optionally oxidative cleavage,
vi) reaction with an enophile in an ene reaction,
vii) addition of halogens or hydrogen halides or
viii) hydroformylation
of a group of the formula V.

The stated functionalizations can take place as follows:
i) Hydrosilylation

For the functionalization, a polyisobutene prepared in accordance with the process according to the invention can be subjected to a reaction with a silane in the presence of a silylation catalyst to give a polyisobutene at least partly functionalized with silyl groups.

Suitable hydrosilylation catalysts are e.g. transition metal catalysts, where the transition metal is preferably selected from Pt, Pd, Rh, Ru and Ir. Suitable platinum catalysts include, for example, platinum in finely divided form ("platinum black"), platinum chloride and platinum complexes such as hexachloroplatinic acid or divinyldisiloxane-platinum complexes, e.g. tetramethyldivinyldisiloxane-platinum complexes. Suitable rhodium catalysts are, for example, (RhCl(P($C_6H_5$)$_3$)$_3$) and $RhCl_3$. Also suitable are $RuCl_3$ and $IrCl_3$. Suitable catalysts are also Lewis acids such as $AlCl_3$ or $TiCl_4$, and also peroxides. In this connection, it may be advantageous to use combinations or mixtures of the aforementioned catalysts.

Suitable silanes are e.g. halogenated silanes, such as trichlorosilane, methyldichlorosilane, dimethylchlorosilane and trimethylsiloxydichlorosilane; alkoxysilanes, such as methyldimethoxysilane, phenyldimethoxysilane, 1,3,3,5,5,7,7-heptamethyl-1,1-dimethoxytetrasiloxane and trialkoxysilanes, e.g. trimethoxysilane and triethoxysilane, and also acyloxysilanes. Preference is given to using trialkoxysilanes.

The reaction temperature in the silylation is preferably in a range from 0 to 140° C., particularly preferably 40 to 120° C. The reaction is usually carried out under atmospheric pressure, but can also take place at increased pressures, such as e.g. in the range from about 1.5 to 20 bar, or reduced pressures, such as e.g. 200 to 600 mbar.

The reaction can take place without solvent or in the presence of a suitable solvent. Preferred solvents are, for example, toluene, tetrahydrofuran and chloroform.
ii) Hydrosulfuration For the functionalization, a polyisobutene prepared in accordance with the process according to the invention is subjected to a reaction with hydrogen sulfide or a thiol, such as alkylthiols or arylthiols, hydroxy mercaptans, amino mercaptans, thiocarboxylic acids or silanethiols to give a polyisobutene at least partly functionalized with thio groups. Suitable hydro-alkylthio additions are described in J. March, Advanced Organic Chemistry, 4th edition, Verlag John Wiley & Sons, pp. 766-767, to which reference is made here in its entirety. The reaction can generally take place either in the absence or in the presence of initiators, and also in the presence of electromagnetic radiation. In the case of the addition of hydrogen sulfide, polyisobutenes functionalized with thiol groups are obtained. The addition of hydrogen sulfide preferably takes place at temperatures below 100° C. and a pressure of from 1 to 50 bar, particularly preferably of about 10 bar. Moreover, the addition preferably takes place in the presence of a cation exchange resin, such as Amberlyst 15. In the case of the reaction with thiols in the absence of initiators, the Markovnikov addition products onto the double bond are usually obtained. Suitable initiators of the hydro-alkylthio addition are, for example, protic acids and Lewis acids such as concentrated sulfuric acid or $AlCl_3$, and acidic cation exchangers such as Amberlyst 15. Suitable initiators are also those which are capable of forming free radicals, such as peroxides or azo compounds. In the case of the hydro-alkylthio addition in the presence of these initiators, the anti-Markovnikov addition products are generally obtained. The reaction can also take place in the presence of electromagnetic radiation of wavelength from 400 to 10 nm, preferably 200 to 300 nm.
iii) Electrophilic Substitution on Aromatics For the derivatization, a polyisobutene prepared in accordance with the process according to the invention can be reacted with a compound which has at least one aromatic or heteroaromatic group in the presence of an alkylation catalyst. Suitable aromatic and heteroaromatic compounds, catalysts and reaction conditions of this so-called Friedel-Crafts alkylation are described, for example, in J. March, Advanced Organic Chemistry, 4th edition, Verlag John Wiley & Sons, p. 534-539, to which reference is hereby made.

An activated aromatic compound is preferably used for the alkylation. Suitable aromatic compounds are, for example, alkylaromatics, alkoxyaromatics, hydroxyaromatics or activated heteroaromatics, such as thiophenes or furans.

The aromatic hydroxy compound used for the alkylation is preferably selected from phenolic compounds having 1, 2 or 3 OH groups and can optionally have at least one further substituent. Preferred further substituents are $C_1$-$C_8$-alkyl groups and in particular methyl and ethyl. Preference is given in particular to compounds of the general formula,

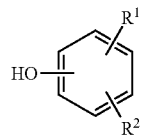

in which $R^1$ and $R^2$, independently of one another, are hydrogen, OH or $CH_3$. Particular preference is given to phenol, the cresol isomers, catechol, resorcinol, pyrogallol, fluoroglucinol and the xylenol isomers. In particular, phenol, o-cresol and p-cresol are used. If desired, it is also possible to use mixtures of the aforementioned compounds for the alkylation. Also of suitability are polyaromatics, such as polystyrene, polyphenylene oxide or polyphenylene sulfide, or copolymers of aromatics, for example with butadiene, isoprene, (meth)acrylic acid derivatives, ethylene or propylene.

The catalyst is preferably selected from Lewis-acidic alkylation catalysts, which, within the context of the present application, are understood as meaning both individual acceptor atoms and acceptor ligand complexes, molecules, etc., provided they have overall (externally) Lewis-acidic (electron acceptor) properties. These include, for example, $AlCl_3$, $AlBr_3$, $BF_3$, $BF_3.2C_6H_5OH$, $BF_3[O(C_2H_5)_2]_2$, $TiCl_4$, $SnCl_4$, $AlC_2H_5Cl_2$, $FeCl_3$, $SbCl_5$ and $SbF_5$. These alkylation catalysts can be used together with a cocatalyst, for example an ether. Suitable ethers are di($C_1$-$C_8$-)alkyl ethers, such as dimethyl ether, diethyl ether, di-n-propyl ether, and tetrahydrofuran, di($C_5$-$C_8$-)cycloalkyl ethers, such as dicyclohexyl ether, and ethers having at least one aromatic hydrocarbon radical, such as anisole. If a catalyst-cocatalyst complex is used for the Friedel-Crafts alkylation, the quantitative molar ratio of catalyst to cocatalyst is preferably in a range from 1:10 to 10:1. The reaction can also be catalyzed with protic acids such as sulfuric acid, phosphoric acid or trifluoromethanesulfonic acid. Organic protic acids can also be present in polymer-bound form, for example as ion exchange resin. Zeolites and inorganic polyacids are also suitable.

The alkylation can be carried out without solvents or in a solvent. Suitable solvents are, for example, n-alkanes and mixtures thereof, and alkylaromatics, such as toluene, ethylbenzene and xylene, and halogenated modifications thereof.

The alkylation is preferably carried out at temperatures between −10° C. and +100° C. The reaction is usually carried out at atmospheric pressure, but may also be carried out at higher or lower pressures.

Through suitable selection of the quantitative molar ratios of aromatic or heteroaromatic compound to polyisobutene and of the catalyst, it is possible to adjust the achieved fraction of alkylated products and their degree of alkylation. Essentially monoalkylated polyisobutenylphenols are generally obtained with an excess of phenol or in the presence of a Lewis-acidic alkylation catalyst if an ether is additionally used as cocatalyst.

For the further functionalization, the resulting polyisobutenylphenol can be subjected to a Mannich-type reaction with at least one aldehyde, for example formaldehyde, and at least one amine which has at least one primary or secondary amine function, giving a polyisobutene-alkylated and additionally at least partly aminoalkylated compound. It is also possible to use reaction products and/or condensation products of aldehyde and/or amine. The preparation of such compounds is described in WO 01/25 293 and WO 01/25 294, to which reference is hereby made in its entirety.

iv) Epoxidation

For the functionalization, a polyisobutene prepared in accordance with the process according to the invention can be reacted with at least one peroxide compound to give an at least partially peroxidized polyisobutene. Suitable processes for epoxidation are described in J. March, Advanced Organic Chemistry, 4$^{th}$ edition, Verlag John Wiley & Sons, p. 826-829, which is hereby incorporated by reference. The peroxide compound used is preferably at least one peracid, such as m-chloroperbenzoic acid, performic acid, peracetic acid, trifluoroperacetic acid, perbenzoic acid and 3,5-dinitroperbenzoic acid. The peracids can be prepared in situ from the corresponding acids and $H_2O_2$ optionally in the presence of mineral acids. Further suitable epoxidation reagents are, for example, alkaline hydrogen peroxide, molecular oxygen and alkyl peroxides, such as tert-butyl hydroperoxide. Suitable solvents for the epoxidation are, for example, customary nonpolar solvents. Particularly suitable solvents are hydrocarbons such as toluene, xylene, hexane or heptane. The epoxide formed can then be reacted in a ring-opening reaction with water, acids, alcohols, thiols or primary or secondary amines, giving, inter alia, diols, glycol ethers, glycol thioethers and amines.

v) Hydroboration

For the functionalization, a polyisobutene prepared in accordance with the process according to the invention can be subjected to a reaction with an (optionally in situ generated) borane, giving an at least partly hydroxylated polyisobutene. Suitable processes for the hydroboration are described in J. March, Advanced Organic Chemistry, 4$^{th}$ edition, Verlag John Wiley & Sons, p. 783-789, to which reference is hereby made. Suitable hydroboration reagents are, for example, diboranee, which is generally generated in situ by reacting sodium borohydride with $BF_3$ etherate, diisoamylboranee (bis[3-methyl-but-2-yl]boranee), 1,1,2-trimethylpropylboranee, 9-borobicyclo[3.3.1]nonane, diisocamphenylboranee, which are obtainable by hydroboration of the corresponding alkenes with diboranee, chloroboranee-dimethyl sulfide, alkyldichloroboranees or $H_3B$—$N(C_2H_5)_2$.

The hydroboration is usually carried out in a solvent. Suitable solvents for the hydroboration are, for example, acyclic ethers such as diethyl ether, methyl tert-butyl ether, dimethoxyethane, diethylene glycol dimethyl ether, triethylene glycol dimethyl ether, cyclic ethers such as tetrahydrofuran or dioxane, and hydrocarbons such as hexane or toluene or mixtures thereof. The reaction temperature is generally determined by the reactivity of the hydroboration agent and is normally between the melting point and the boiling point of the reaction mixture, preferably in the range from 0° C. to 60° C.

The hydroboration agent is usually used in excess based on the alkene. The boron atom adds preferentially to the less substituted and thus less sterically hindered carbon atom.

The alkylboranees formed are usually not isolated, but converted directly to the products of value by subsequent reaction. A very important reaction of the alkylboranees is the reaction with alkaline hydrogen peroxide to give an alcohol, which preferably corresponds formally to the anti-Markovnikov hydration of the alkene. Furthermore, the resulting alkylboranees can be subjected to a reaction with bromine in the presence of hydroxide ions to give the bromide.

vi) Ene Reaction

For the functionalization, a polyisobutene prepared in accordance with the process according to the invention can be reacted with at least one alkene which has an electrophile-substituted double bond in an ene reaction (see e.g. DE-A 4 319 672 or H. Mach and P. Rath in Lubrication Science V (1999), p. 175-185, to which reference is made in its entirety). In the ene reaction, an alkene having an allyl-position hydrogen atom, referred to as ene, is reacted with an electrophilic alkene, the so-called enophile, in a pericyclic reaction comprising a carbon-carbon bond linkage, a double bond shift and a hydrogen transfer. In the present case, the polyisobutene reacts as the ene. Suitable enophiles are compounds as are also used as dienophiles in the Diels-Alder reaction. Preference is given to using maleic anhydride as the enophile. This results in polyisobutenes functionalized at least partly with succinic anhydride groups.

The ene reaction can optionally be carried out in the presence of a Lewis acid as catalyst. Aluminum chloride and ethylaluminum chloride, for example, are suitable.

For the further functionalization, a polyisobutene derivatized with succinic anhydride groups can be subjected to a subsequent reaction which is selected from:

a) reaction with at least one amine to give a polyisobutene functionalized at least partly with succinimide groups and/or succinamide groups, b) reaction with at least one alcohol to give a polyisobutene functionalized at least partly with succinic ester groups, and, c) reaction with at least one thiol to give a polyisobutene functionalized at least partly with succinic thioester groups.

Vii) Addition of Halogen or Hydrogen Halides

For the functionalization, a polyisobutene prepared in accordance with the process according to the invention can be subjected to a reaction with hydrogen halide or a halogen to give a polyisobutene functionalized at least partly with halogen groups. Suitable reaction conditions of the hydro-halo addition are described in J. March, Advanced Organic Chemistry, 4$^{th}$ edition, Verlag John Wiley & Sons, p. 758-759, to which reference is hereby made. Of suitability for the addition of hydrogen halide are in principle HF, HCl, HBr and HI. The addition of HI, HBr and HF can generally take place at room temperature, whereas elevated temperatures are generally used for the addition of HCl.

The addition of hydrogen halides can take place in principle in the absence or in the presence of initiators or of electromagnetic radiation. In the case of the addition in the absence of initiators, specifically of peroxides, the Markovnikov addition products are generally obtained. With addition of peroxides, the addition of HBr leads generally to anti-Markovnikov products.

The halogenation of double bonds is described in J. March, Advanced Organic Chemistry, 4$^{th}$ edition, Verlag John Wiley & Sons, p. 812-814, to which reference is hereby made. For the addition of Cl, Br and I, the free halogens can be used. To obtain mixed-halogenated compounds, the use of interhalogen compounds is known. For the addition of fluorine, fluorine-containing compounds, such as $CoF_3$, $XeF_2$ and mixtures of $PbO_2$ and $SF_4$, are generally used. Bromine generally adds at room temperature in good yields to double bonds. For the addition of chlorine, besides the free halogen, it is also possible to use chlorine-containing reagents, such as $SO_2Cl_2$, $PCl_5$ etc.

If chlorine or bromine is used for halogenation in the presence of electromagnetic radiation, essentially the products of free-radical substitution on the polymer chain are obtained and not, or only to a minor degree, addition products to the terminal double bond.

Preferred functionalization products are the bisepoxides, dithiols, diols (anti-Markovnikov products as are obtainable e.g. from the hydroboration and Markovnikov products as are obtainable e.g. from the epoxidation and subsequent reaction of the epoxide with water and optionally an acid) and bis(trialkoxysilanes).

Certain polyisobutenes obtainable by the process according to the invention which are terminated at one chain end by a group of the formula V and have a terminating group different therefrom as described above at the opposite end of the chain can be functionalized differently on account of the differing reactivities of the terminating groups. This is advantageous in particular for using the polyisobutene in fuels and lubricants since hydrophilic and hydrophobic properties have to meet here. Furthermore, the simple accessibility of the compound of the formula (I) is advantageous. Since only a chain growing at one end is initiated with the compound of the formula (I), the required amount of Lewis acid and terminating reagent is reduced compared to polyfunctional initiators. Moreover, the terminating groups originating from the initiator are not subjected to the secondary reactions specified at the start which arise when using polyfunctional aromatic initiators from the prior art.

viii) Hydroformylation

As regards the hydroformylation or oxosynthesis, reference is made to the 2012 online edition of Ullmann's Encyclopedia of Industrial Chemistry (Online ISBN: 9783527306732). A description of the reaction is found therein in the chapters "Oxo Synthesis" (authors H. Bahrmann and H. Bach; DOI: 10.1002/14356007.a18_321) and also "Carbonylation" (authors W. Bertleff, M. Roeper, X. Sava; DOI: 10.1002/14356007.a05_217.pub2). Reference is made expressly thereto and to the literature cited therein.

The examples below serve to illustrate the invention in more detail.

EXAMPLES

Example 1

Preparation of 2,2,4,4-tetramethyltetrahydrofuran (TMTHF)

150 g of silica gel were introduced into a 500 ml four-neck flask fitted with dropping funnel and distillation bridge with receiver. A solution which had been prepared by adding 12 g of conc. $H_2SO_4$ and 2.4 g of NaOH to 150 ml of water was added thereto. Under a stream of $N_2$, the water was distilled off up to a bath temperature of 170° C. Then, over 4 h, 360 g of molten 2,2,4-trimethylpentanediol-(1,3) were added dropwise, during which the bath temperature was increased to 190° C. Crude TMTHF distilled over, which was collected in the receiver over $NaHCO_3$ solution. In the separating funnel, the aqueous phase was separated off and the organic phase was washed three times with water and dried with $Na_2SO_4$.

The organic phase was distilled, and 266 g of a fraction from the boiling range 118° C.-138° C. were collected. According to NMR, this consisted to 81% of TMTHF:

$^1$H-FT-NMR (500 MHz, 16 scans, $CD_2Cl_2$):

1.22 ppm, 6H, S; 1.38 ppm, 6H, S; 1.73 ppm, 2H, S; 3.60 ppm, 2H, S.

Example 2

Preparation of 4-chloro-2,2,4-trimethylpentyl acetate 266 g of TMTHF from example 1 (81%) were introduced into a 1000 ml four-neck flask fitted with dropping funnel, thermometer and stirrer, and 2 g of zinc powder were added. With ice bath cooling, 138.5 g of acetyl chloride were added dropwise in the range from 15° C.-25° C., and the mixture was then stirred for 45 min at 45° C. At room temperature, the mixture was washed three times with $NaHCO_3$ solution, diluted with $CH_2Cl_2$ and washed with water. The mixture was dried with $Na_2SO_4$ and filtered, and the solvent was stripped off on a rotary evaporator at 50° C. and 200 mbar. 305 g of a readily mobile liquid which, according to NMR, consisted to 75% of 4-chloro-2,2,4-trimethylpentyl acetate (as well as TMTHF and 2,2,4-trimethylpenten(-4)yl acetate).

$^1$H-FT-NMR (500 MHz, 16 scans, $CD_2Cl_2$):

1.09 ppm, 6H, S; 1.66 ppm, 6H, S; 1.93 ppm, 2H, S; 2.08 ppm, 3H, S; 3.90 ppm, 2H, S.

Example 3

Polymerization of isobutene with 4-chloro-2,2,4-trimethylpentyl acetate 1000 ml of dry n-chlorobutane and 134 g of isobutene were introduced into a 2 l four-neck flask at −10° C. Then, 81 g of 4-chloro-2,2,4-trimethylpentyl acetate from example 2 (75%) and 3 g of pyridine were added, and the polymerization was started with 40 ml of TiCl$_4$. By means of a cooling bath, a temperature of −10° C. was held over 60 min. 500 ml of hexane were then added and the reaction was terminated with 300 ml of isopropanol. The hexane/isobutene phase was separated off, washed three times with water and dried with Na$_2$SO$_4$. The solvent was stripped off on a rotary evaporator at 120° C. and 50 mbar. This gave 160 g of a clear, pale oil.

GPC: Mn=1200; Mw=1900

$^1$H-FT-NMR (500 MHz, 16 scans, CD$_2$Cl$_2$):

3.79 ppm (CH$_3$—CO—C$\underline{H}_2$—C(CH$_3$)$_2$—); 2.03 ppm (C$\underline{H}_3$—CO—CH$_2$—C(CH$_3$)$_2$—); 1.52 ppm (CH$_3$—CO—CH$_2$—C(C$\underline{H}_3$)$_2$—); 1.43 ppm (—[C$\underline{H}_2$—C(CH$_3$)$_2$]$_n$—); 1.12 ppm (—[CH$_2$—C(C$\underline{H}_3$)$_2$]$_n$—);

GPC and NMR reveals a functionality of 70%.

We claim:

1. A process for preparing a bifunctional polyisobutene, comprising polymerizing isobutene or a monomer mixture comprising isobutene in the presence of a Lewis acid and a compound of formula I:

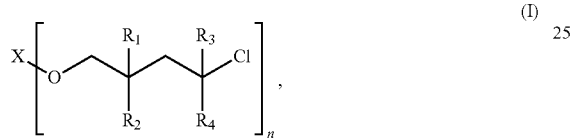

wherein

X is an acyl radical of formula R$_5$CO— or a radical of an organic or inorganic acid group which is covalently bonded to the oxygen atom of the compound (I) with its central atom Z, which is selected from the group consisting of S, P, N and B, carries a double-bonded oxygen atom, and has optionally present hydroxyl functions in esterified form, and R$_1$, R$_2$, R$_3$, R$_4$, and R$_5$ are each independently hydrogen, or an aliphatic, cycloaliphatic or aromatic hydrocarbon radical which has 1 to 20 carbon atoms, wherein in the case of n=2 to 4, R$_5$ can be further substituted with a further acyl group at (n−1) position.

2. The process according to claim 1, where the Lewis acid is selected from the group consisting of titanium tetrachloride, boron trichloride, tin tetrachloride, aluminum trichloride, dialkylaluminum chloride, alkylaluminum dichloride, vanadium pentachloride, iron trichloride and boron trifluoride.

3. The process according to claim 1, wherein the polymerizing takes place in the presence of at least one electron donor selected from the group consisting of pyridines, amides, lactams, ethers, amines, esters, thioethers, sulfoxides, nitriles, phosphines and non-polymerizable, aprotic organosilicon compounds which have an organic radical bonded via oxygen.

4. The process according to claim 1, further comprising reacting the polyisobutene formed during the polymerizing with a coupling agent, as a result of which two or more polymer chains are joined to form a molecule via their distal ends.

5. The process according to claim 4, wherein the coupling agent is selected from the group consisting of:
   a compound which has at least two 5-membered heterocycles with a heteroatom selected from the group consisting of oxygen, sulfur and nitrogen,
   a compound with at least two allyl-position trialkylsilyl groups, and
   a compound with at least two vinylidene groups arranged conjugated to in each case two aromatic rings.

6. The process according to claim 1, wherein the polymerizing is carried out in a continuous process which comprises:
   continuously metering in starting materials comprising isobutene, solvent, initiator and optionally further additives into a mixer and mixing the starting materials in a mixing unit;
   starting continuous polymerization by continuous metering in of a Lewis acid and mixing with the starting materials at reaction temperature; and
   continuously polymerizing, by conveying the resulting reaction mixture through a reaction zone thermostated to reaction conditions.

7. The process according to claim 1, wherein the polymerizing is carried out in milli reactors with a characteristic dimension of from 0.1 to 30 mm.

* * * * *